United States Patent
Lee et al.

(10) Patent No.: US 8,472,442 B2
(45) Date of Patent: *Jun. 25, 2013

(54) METHOD AND APPARATUS OF DOWNSTREAM SERVICE FLOWS CLASSIFICATION FOR HEADEND CABLE MODEM

(75) Inventors: Ho-Sook Lee, Daejeon (KR); Hye Ju Oh, Daejeon (KR); Dong Joon Choi, Daejeon (KR); O Hyung Kwon, Daejeon (KR); Soo In Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 183 days.

This patent is subject to a terminal disclaimer.

(21) Appl. No.: 12/188,542

(22) Filed: Aug. 8, 2008

(65) Prior Publication Data

US 2009/0147788 A1    Jun. 11, 2009

(30) Foreign Application Priority Data

Dec. 5, 2007   (KR) .................. 10-2007-0125474

(51) Int. Cl.
   *H04L 12/28*   (2006.01)
   *H04L 12/56*   (2006.01)
   *H04N 7/173*   (2006.01)

(52) U.S. Cl.
   USPC ............ 370/392; 370/230; 370/389; 725/105

(58) Field of Classification Search
   CPC ........... H04L 12/28; H04L 12/56; H04N 7/173
   USPC .......................... 370/230, 392, 389; 725/105
   See application file for complete search history.

(56) References Cited

U.S. PATENT DOCUMENTS

| 5,060,228 | A  | * | 10/1991 | Tsutsui et al. | 370/402 |
| 6,788,683 | B1 | * | 9/2004  | Ikeda et al.   | 370/389 |
| 7,161,945 | B1 | * | 1/2007  | Cummings       | 370/401 |
| 7,388,870 | B2 | * | 6/2008  | Pfeffer et al. | 370/401 |
| 7,408,877 | B2 | * | 8/2008  | Chandran et al.| 370/230 |
| 7,606,154 | B1 | * | 10/2009 | Lee            | 370/232 |
| 7,742,406 | B1 | * | 6/2010  | Muppala        | 370/230 |
| 2003/0031178 | A1 | * | 2/2003 | Haeri et al.   | 370/392 |

(Continued)

FOREIGN PATENT DOCUMENTS

| KR | 1020060068277   | 6/2006 |
| KR | 1020070042642 A | 4/2007 |
| KR | 1020080052163   | 6/2008 |

OTHER PUBLICATIONS

DOCSIS (Data-Over-Cable Service Interface Specifications DOCSIS 3.0; Revision 105, Published: Aug. 3, 2007).*

*Primary Examiner* — Ayaz Sheikh
*Assistant Examiner* — Tarell Hampton
(74) *Attorney, Agent, or Firm* — William Park & Associates Patent Ltd.

(57) ABSTRACT

A method and apparatus of classifying downstream service flows for a cable modem is provided. A method of classifying downstream service flows, the method including: classifying a service flow based on a Quality of Service (QoS) using a destination address of an inputted packet; composing an internal header including corresponding service flow information based on the classifying of the service flow; and adding the internal header to the inputted packet.

16 Claims, 6 Drawing Sheets

U.S. PATENT DOCUMENTS

2006/0182118 A1* 8/2006 Lam et al. ................ 370/395.42
2006/0251065 A1* 11/2006 Hamamoto et al. .......... 370/389
2008/0130641 A1* 6/2008 Lee et al. ...................... 370/389
2009/0040924 A1* 2/2009 Evans ........................... 370/230

* cited by examiner

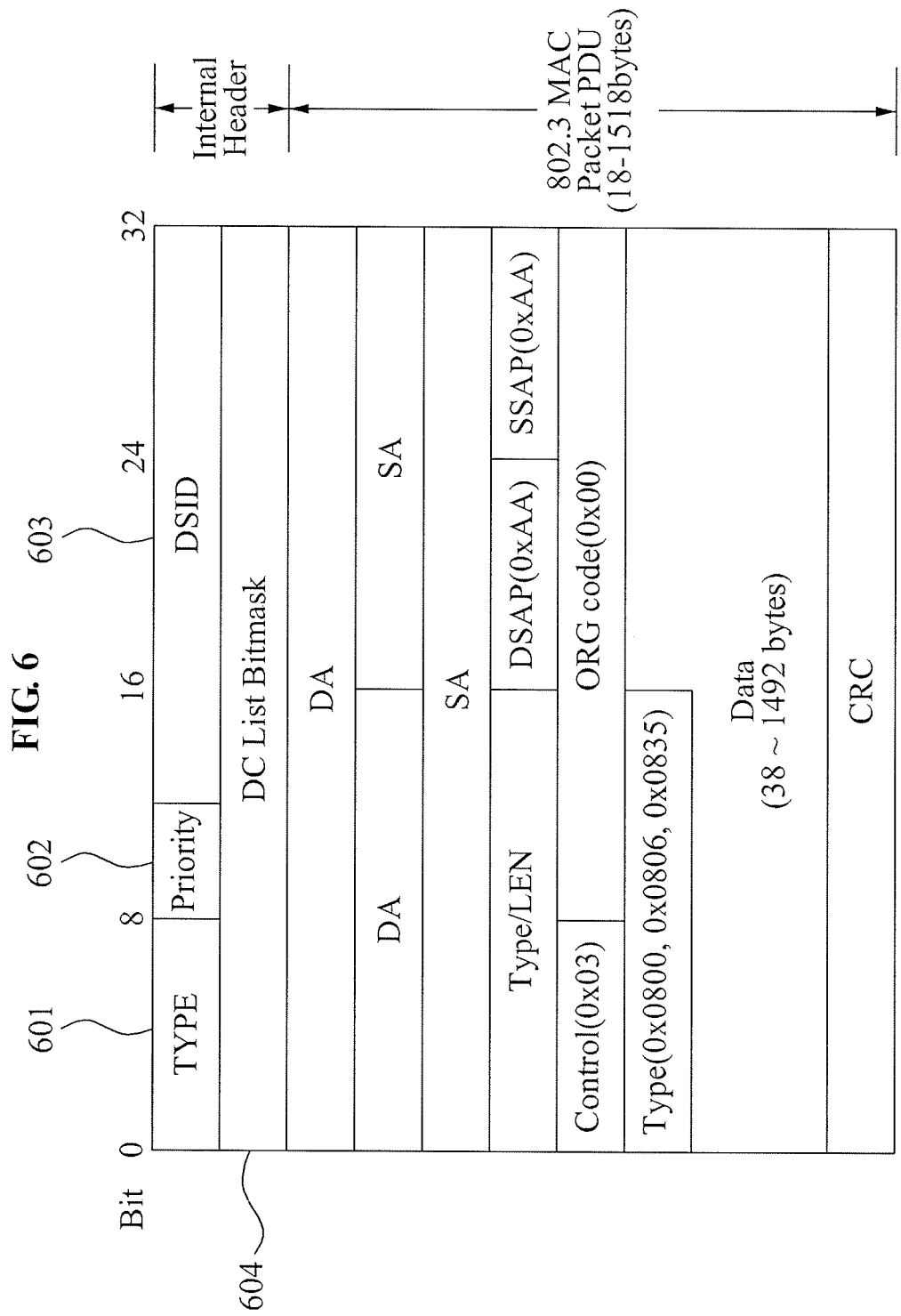

METHOD AND APPARATUS OF DOWNSTREAM SERVICE FLOWS CLASSIFICATION FOR HEADEND CABLE MODEM

CROSS-REFERENCE TO RELATED APPLICATION

This application claims priority from Korean Patent Application No. 10-2007-0125474, filed on Dec. 5, 2007, in the Korean Intellectual Property Office, the entire disclosure of which is incorporated herein by reference.

BACKGROUND OF THE INVENTION

1. Field of the Invention

The present invention relates to downstream service flow processing in a network, for example, a Hybrid Fiber Coax (HFC) network, and more particularly, to a method and apparatus of classifying a cable modem (CM) to which a packet is transmitted, with respect to downstream packets transmitted from a network service interface to a Cable Modem Termination System (CMTS) located in a headend, and classifying a service flow to transmit the packet based on a classification rule of a corresponding CM.

This work was supported by the IT R&D program of MIC/IITA [2006-S-019-02, The Development of Digital Cable Transmission and Receive System for 1 Gbps Downstream].

2. Description of Related Art

A Hybrid Fiber Coax (HFC) network is a network including an optical fiber and a coaxial cable, and is a broadband transmission network to transmit a data signal (the Internet, a cable television (TV), crime prevention, disaster prevention, remote inspection of a meter, and automatic control) using the optical fiber to a broadcasting station and an Optical Network Unit (ONU), and using the coaxial cable from the ONU to members.

A downstream data packet inputted using a network interface in a cable network following Data Over Cable Service Interface Specifications (DOCSIS) must be transmitted to a receivable channel of a corresponding cable modem (CM) in order to transmit the downstream data packet to a specific CM.

A channel transmittable to the corresponding CM may be one, or may be a plurality of channels when supporting channel bonding. Downstream packets are classified into service flows in accordance with each Quality of Service (QoS) and are scheduled to the channel transmittable to the CM.

Accordingly, a Cable Modem Termination System (CMTS) must allocate and classify the service flows based on the QoS requested from the CM.

A single CM may admit a plurality of service flows, and a single channel must transmit the plurality of service flows. When the CM receives downstream data by a plurality of channels using the channel bonding, a single service flow may be distributed into the plurality of channels using a bonded channel group and be transmitted.

Accordingly, all downstream packets in the HFC network following DOCSIS must be classified into service flows and be scheduled to a channel by which the corresponding service flow from among various downstream channels of the CMTS is transmittable.

SUMMARY OF THE INVENTION

An aspect of the present invention provides a method and apparatus of classifying downstream service flows which can classify a Media Access Control (MAC) address of a cable modem (CM) to which a packet is transmitted, using a destination MAC address of downstream data packets in an Institute of Electrical and Electronics Engineers (IEEE) 802.3 MAC/DEC-Intel-Xerox (DIX) configuration, the downstream data packets transmitted from a network interface to a Cable Modem Termination System (CMTS) in a Data Over Cable Service Interface Specifications (DOCSIS)-based cable network.

Another aspect of the present invention also provides a method and apparatus of classifying downstream service flows which can compose a search pattern to search for a service flow using a CM MAC address and an upper data portion of an inputted packet.

Another aspect of the present invention also provides a method of classifying a service flow to be transmitted, the service flow corresponding to a Quality of Service (QoS) of a downstream packet from a service flow classification table, and an information table for service flow classification.

Another aspect of the present invention also provides a method of transmitting service flow information to a downstream packet scheduling block, an information table structure and relation to embody the above-described schemes, and a structure of related materials.

According to an aspect of the present invention, there is provided a method of classifying downstream service flows, the method including: classifying a service flow based on a Quality of Service (QoS) using a destination address of an inputted packet; composing an internal header including corresponding service flow information based on the classifying of the service flow; and adding the internal header to the inputted packet.

According to another aspect of the present invention, there is provided a method of classifying downstream service flows, the method including: extracting a destination address of an input packet; determining whether an Ethernet MAC address of a CM to which the input packet is transmitted exists, using the destination address; composing a search character string based on QoS information included in the Ethernet MAC address of the CM and the input packet when the Ethernet MAC address of the CM corresponding to the destination address exists; searching for a reference address corresponding to the search character string and searching for service flow information based on the retrieved reference address when the reference address is retrieved; and composing an internal header including the retrieved service flow information and adding the internal header to the input packet.

According to still another aspect of the present invention, there is provided an apparatus for classifying downstream service flows, the apparatus including: a downstream service flow classifier to receive service flow information about an input packet, and to add an internal header; a service flow classification table to receive a search character string from the downstream service flow classifier, to search for reference address information for searching for the service flow information, and to provide the downstream service flow classifier with the retrieved reference address information; and a service flow information table to provide the downstream service flow classifier with the service flow information corresponding to the retrieved reference address information.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which:

FIG. 6 illustrates an output packet format of a downstream service flow classifier according to an exemplary embodiment of the present invention.

DETAILED DESCRIPTION OF EXEMPLARY EMBODIMENTS

Figure 1:
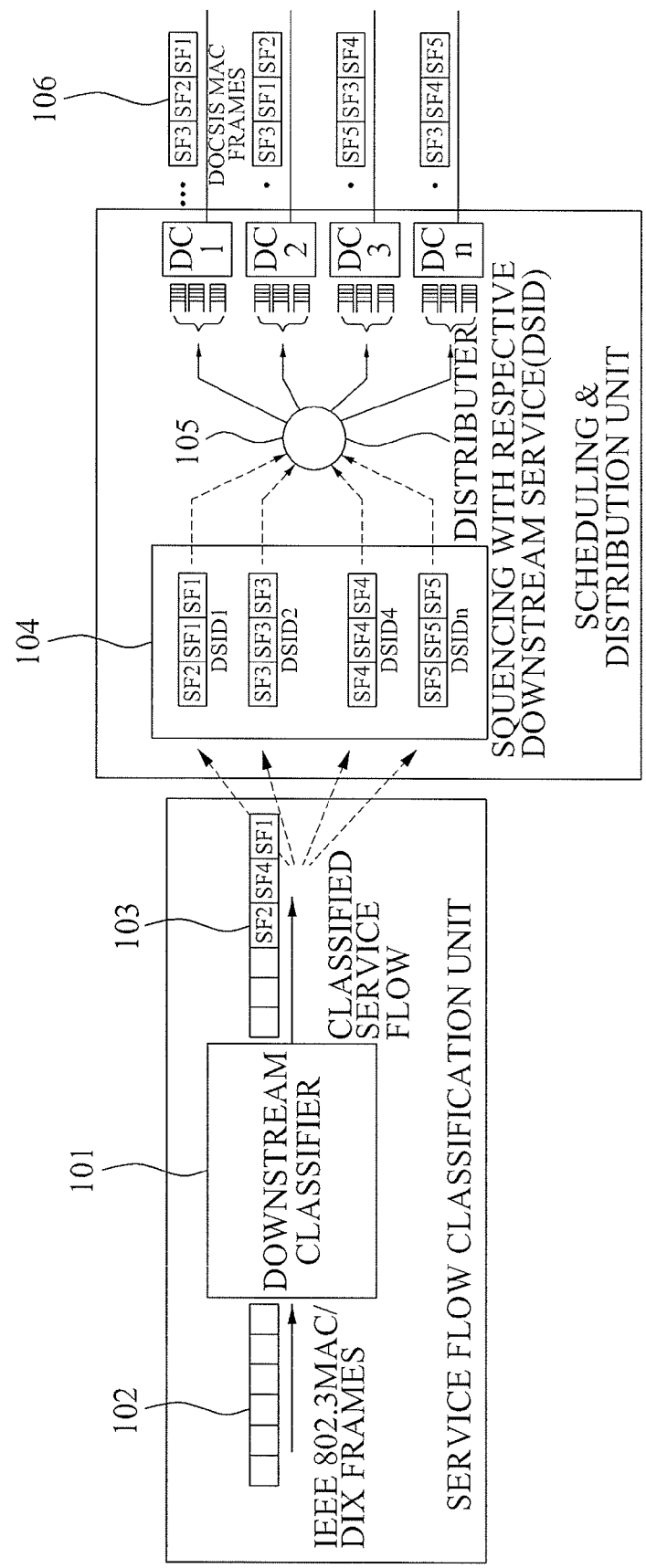
FIG. 1 illustrates a downstream service flow transmission concept according to an exemplary embodiment of the present invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

When detailed descriptions related to a well-known related function or configuration are determined to make the spirits of the present invention ambiguous, the detailed descriptions will be omitted herein. Also, terms used throughout the present specification are used to appropriately describe exemplary embodiments of the present invention, and thus may be different depending upon a user and an operator's intention, or practices of application fields of the present invention. Therefore, the terms must be defined based on descriptions made through the present invention.

FIG. 1 illustrates a downstream service flow transmission concept according to an exemplary embodiment of the present invention.

Referring to FIG. 1, a Cable Modem Termination System Media Access Control (CMTS MAC) layer of a headend includes a service flow classification unit and a scheduling and distribution unit.

The service flow classification unit includes a downstream service flow classifier 101.

The downstream service flow classifier 101 classifies downstream data packets 102 in an Institute of Electrical and Electronics Engineers (IEEE) 802.3 MAC/DEC-Intel-Xerox (DIX) configuration by a service flow unit, the downstream data packets 102 being transmitted from a Data Over Cable Service Interface Specifications (DOCSIS)-based Hybrid Fiber Coax (HFC) network to a Cable Modem Termination System (CMTS).

The downstream service flow classifier 101 classifies a service flow 103 by which a packet is served, based on a Quality of Service (QoS) of each packet The scheduling and distribution unit includes a realignment unit 104 to realign downstream packets 103 classified by a downstream service for supporting a channel bonding function and a distributor 105 to perform scheduling and distribution based on a transmission policy classified by the service flow. Here, service flow information is classified in the downstream packets 103.

The downstream packets are distributed (106) to a downstream channel to which the downstream packets are transmitted, based on the scheduling performed by the distributor 105, and are transmitted to a cable modem (CM).

A configuration of an outputted packet is a frame in which a DOCSIS MAC header for transmission in the HFC network is added to an upper portion of a packet.

A method of classifying downstream service flows according to an exemplary embodiment of the present invention classifies a service flow based on a QoS using a destination address of an inputted packet, composes an internal header including corresponding service flow information based on the classifying of the service flow, and adds the internal header to the inputted packet.

Figure 2:
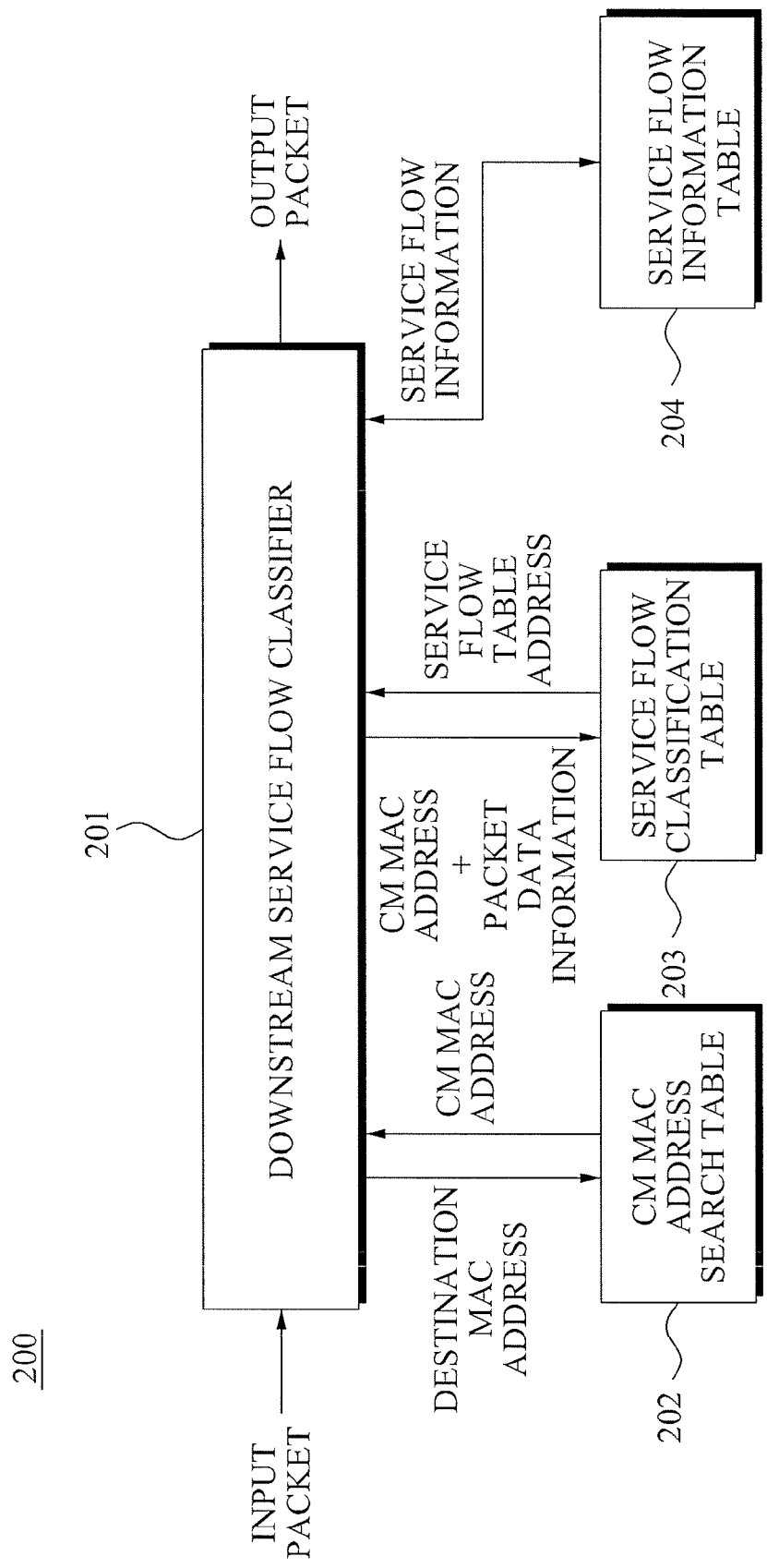
FIG. 2 illustrates an apparatus for classifying downstream service flows according to an exemplary embodiment of the present invention.

FIG. 2 illustrates an apparatus 200 for classifying downstream service flows according to an exemplary embodiment of the present invention.

Referring to FIG. 2, the apparatus 200 for classifying the downstream service flows includes a downstream service flow classifier 201, a CM MAC address search table 202, a service flow classification table 203, and a service flow information table 204.

The downstream service flow classifier 201 receives service flow information about an input packet, and adds an internal header.

According to an exemplary embodiment of the present invention, the downstream service flow classifier 201 classifies a service flow with respect to an input packet in an IEEE 802.3 MAC/DIX configuration transmitted from a network interface based on a QoS, and transmits, to a function block for downstream transmission scheduling, a frame in which the service flow information is added to the internal header.

Figure 3:
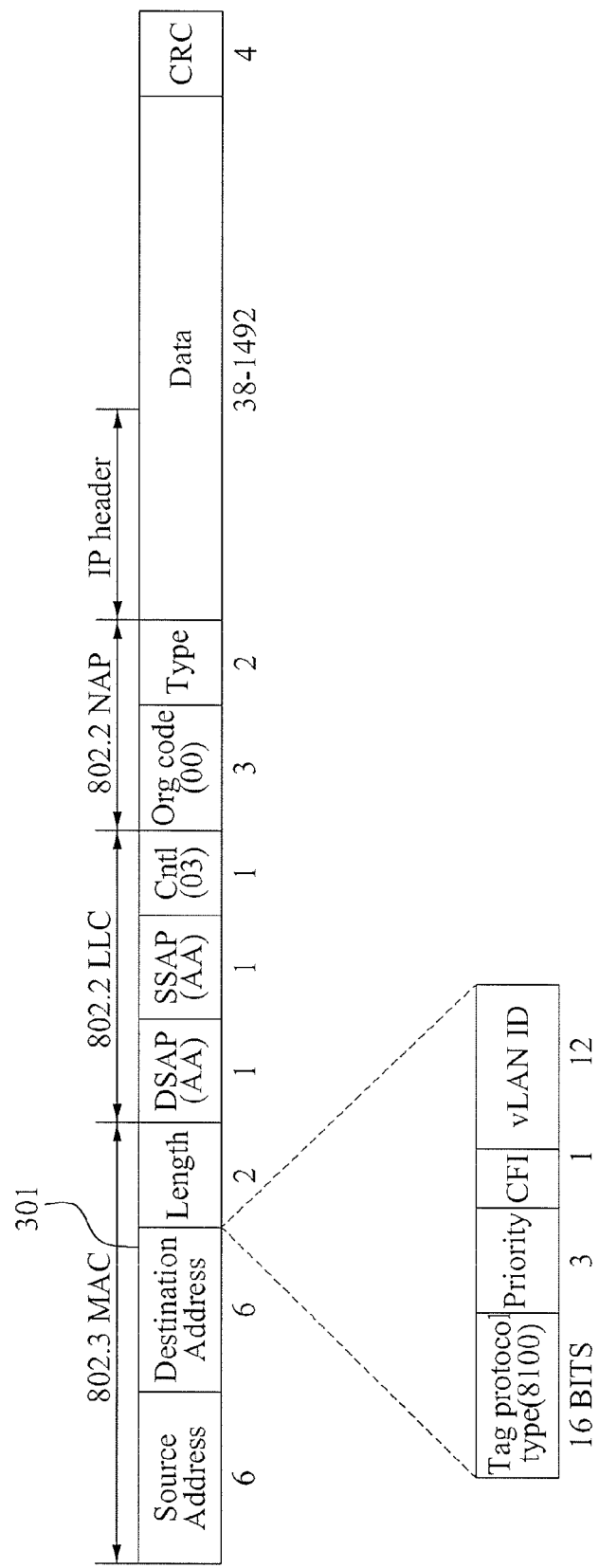
FIG. 3 illustrates a configuration of an input packet according to an exemplary embodiment of the present invention.

According to an exemplary embodiment of the present invention, as illustrated in FIG. 3, a packet format of the input packet includes a destination address 301.

The packet format of the frame in which the internal header is added is illustrated in FIG. 6.

The downstream service flow classifier 201 identifies a CM including a destination node required to transmit a packet from the CM MAC address search table 202 using a destination MAC address of an inputted packet, as an additional service node.

The CM MAC address search table 202 includes a CM MAC address and an Ethernet MAC address with respect to service nodes included in the CM. Accordingly, the CM MAC address search table 202 is composed to search for the Ethernet MAC address of the CM to which the packet is transmitted, from a destination address to which the input packet is transmitted.

The downstream service flow classifier 201 identifies a header portion of the packet including a QoS classification characteristic included in the packet with respect to a downstream packet of classifying the CM to which the packet is transmitted, and classifies the service flow from the service flow classification table 203.

The service flow classification table 203 is composed to return a reference address of the service flow information table 204 including the service flow information using input packet data and the CM MAC address as a search word.

The downstream service flow classifier 201 adds the related service flow information with respect to the input packet in which the service flow is classified, as an internal header configuration, and finally outputs the service flow information to a downstream scheduling block.

According to an exemplary embodiment of the present invention, the CM MAC address search table 202 may include an element of a Content Addressable Memory (CAM) function to search for contents once, the contents being intended to be retrieved, or a Ternary Content Addressable Memory (TCAM) function to be used for a network search engine.

According to an exemplary embodiment of the present invention, the service flow classification table 203 is embodied using a memory of a TCAM scheme to search for contents when a data character string of a specific location is the same.

The service flow information table 204 may be embodied as a Random Access Memory (RAM)-based memory to perform search using an address of related information.

Figure 4:
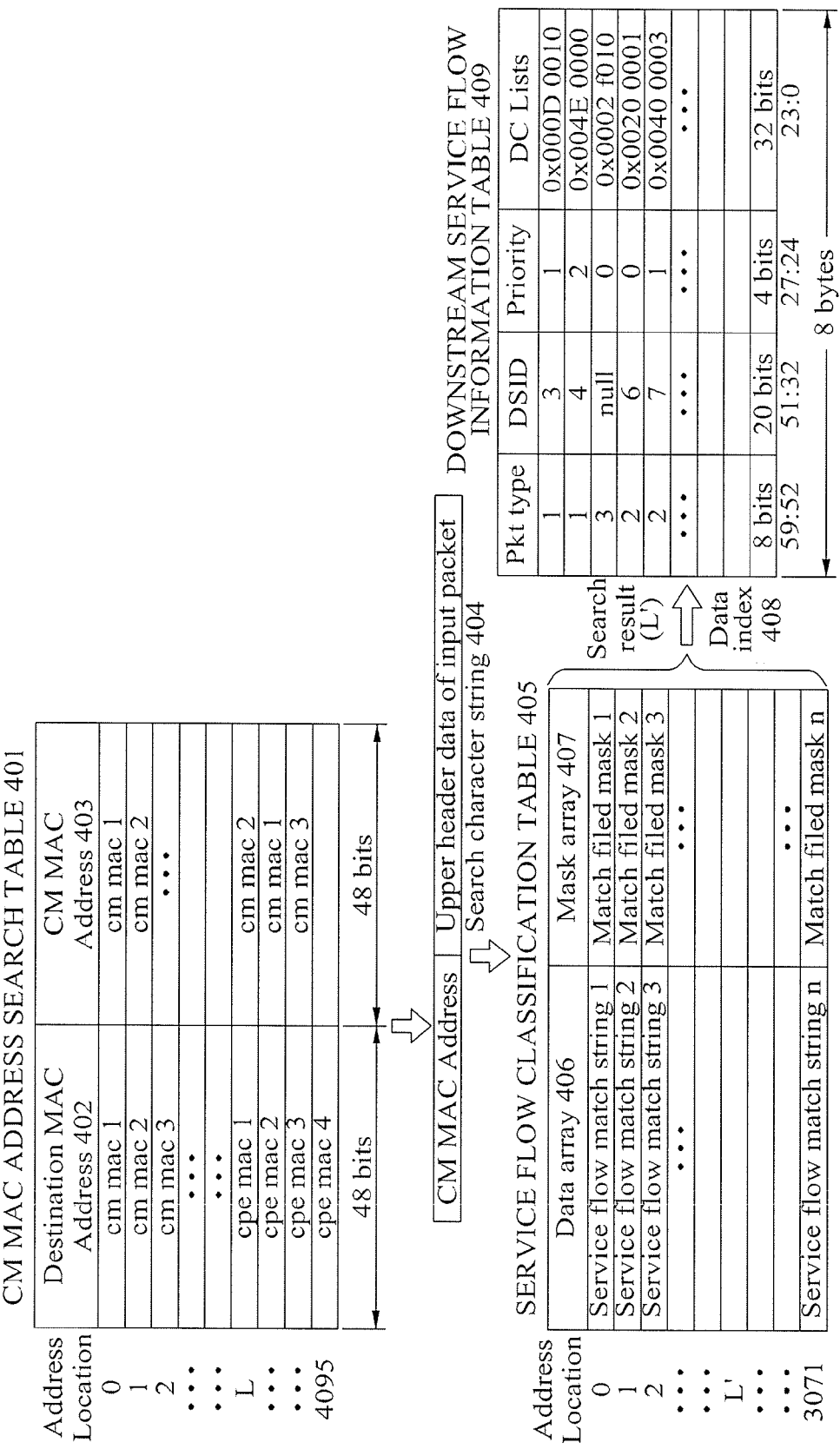
FIG. 4 illustrates a configuration example of an information table for classifying downstream service flows according to an exemplary embodiment of the present invention.

FIG. 4 illustrates a configuration example of an information table for classifying downstream service flows according to an exemplary embodiment of the present invention.

Referring to FIG. 4, a CM MAC address search table 401 provides the downstream service flow classifier 201 with address information of a CM corresponding to a destination address of the input packet.

The CM MAC address search table 401 may include a table to output a 6-byte CM MAC address 403 to which a packet is transmitted, with respect to a destination MAC address 402 of a 6-byte input packet.

CM MAC address registration with respect to service nodes included in a CM may be embodied using presetting by an operator's request, an address training function by a layer-2 (L2) protocol, and the like.

The downstream service flow classifier 201 includes a search character string 404 to extract and add, from an upper bit, all data areas including QoS information for classification from among the retrieved CM MAC address and input packet data, and to search for a service flow classification table 405.

The service flow classification table 405 of FIG. 4 is an information table embodied as a TCAM scheme used for a network search engine.

The service flow classification table 405 may include a memory to output an address of an entry located in a top address matched with the inputted search character string as a search result.

The service flow classification table 405 may include a data array 406 including a search pattern and a mask array 407 of the same length as a data array to indicate locations of data bits desired to be matched from among data arrays as '1'.

The mask array 407 is composed to be the same length as the search character string 404.

A search principle using the search character string 404 outputs an address with respect to data in which all character strings of a location being set as '1' in the mask array from among data arrays are same as the search character string when the search character string is inputted.

When at least one data array in accordance with the above-described condition exists, an address of the data array located in an upper address is outputted. When at least two addresses corresponding to the search character string 404 are retrieved, an address located in the top address is outputted.

When a corresponding data array does not exist, the service flow classification table 405 outputs a search failure signal.

Address information of the data array outputted as a search result from the service flow classification table 405 may be used for a reference (a reference address) of a downstream service flow information table 409.

Since each entry of the service flow classification table 405 is related with each entry of the downstream service flow information table 409 one-to-one, the address information of the data array outputted from the service flow classification table 405 may be used for the reference address.

The downstream service flow classifier 201 calculates a location of the data array acquired by the search result of the service flow classification table 405 using a predetermined rule, and uses the calculated location of the data array for the address of the memory in which the downstream service flow information table 409 is located.

The downstream service flow information table 409 includes at least one of information about whether a channel bonding service is supported for each service flow, information about a DOCSIS header type to be composed (Pkt Type), a Downstream Service Identification (DSID), a priority to be applied to transmission scheduling, and Downstream Channel (DC) list information to be provided with a downstream transmission service.

Figure 5:
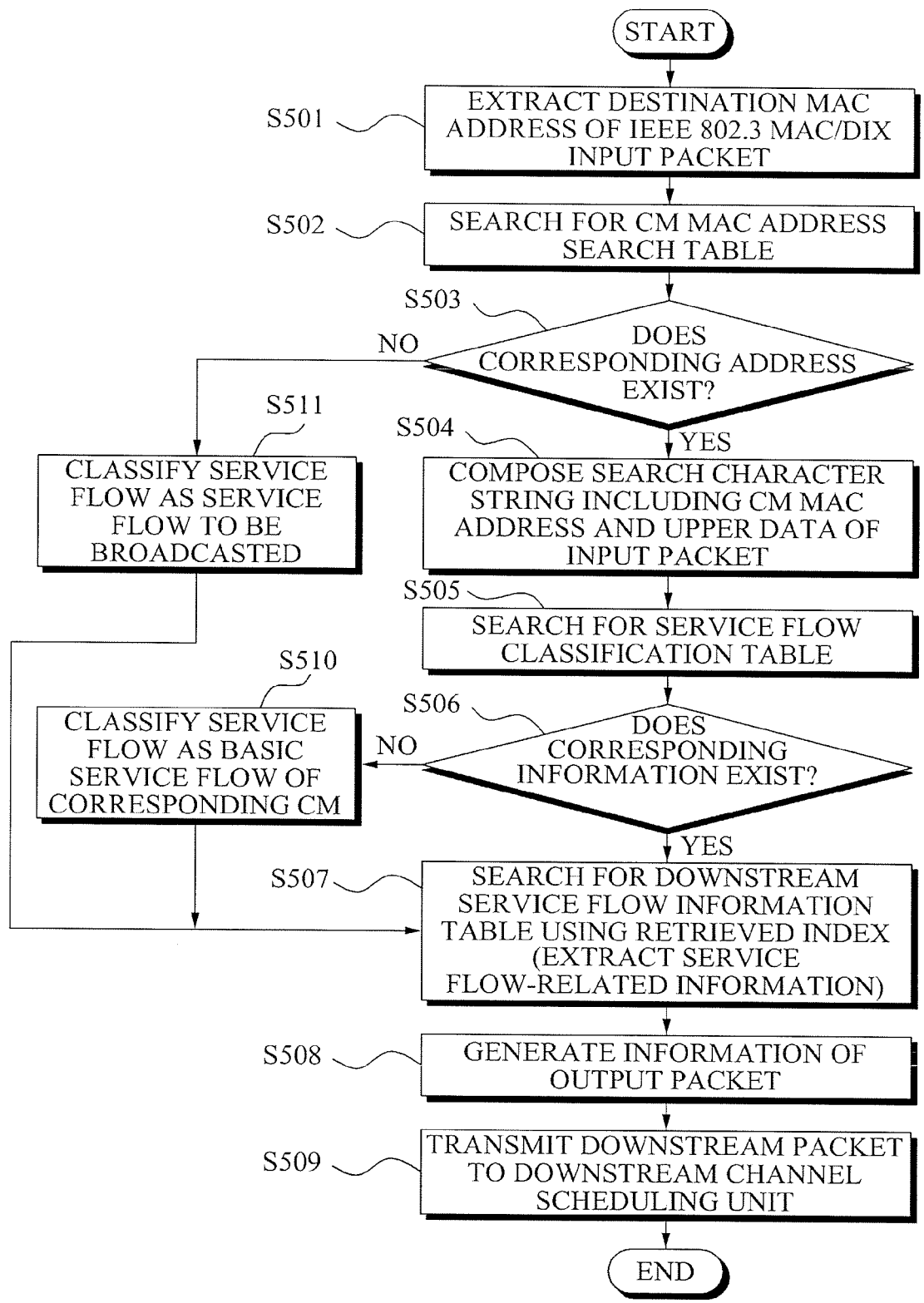
FIG. 5 is a flowchart illustrating a packet classification process of a downstream service flow classifier according to an exemplary embodiment of the present invention.

FIG. 5 is a flowchart illustrating a packet classification process of a downstream service flow classifier according to an exemplary embodiment of the present invention.

Referring to FIG. 5, the packet classification process of the downstream service flow classifier includes extracting a destination address of an input packet in operation S501, determining whether an Ethernet MAC address of a CM to which the input packet is transmitted exists, using the destination address in operations S502 and S503, composing a search character string based on QoS information included in the Ethernet MAC address of the CM and the input packet in operation S504 when the Ethernet MAC address of the CM corresponding to the destination address exists, searching for a reference address corresponding to the search character string and searching for service flow information based on the retrieved reference address in operations S505, S506, and S507 when the reference address is retrieved, and composing an internal header including the retrieved service flow information, adding the internal header to the input packet, and transmitting a downstream packet to a downstream channel scheduling unit in operations S508 and S509.

In operation S501, when a packet in an IEEE 802.3 MAC/DIX configuration reaches from a network interface to a MAC processing unit of a headend CM, the downstream service flow classifier 201 extracts a destination address field from among Ethernet MAC address fields of the reached packet.

In operations S502 and S503, the downstream service flow classifier 201 searches for a CM MAC address search table, and determines whether a corresponding address exists.

In operation S504, when the corresponding address exists, the downstream service flow classifier 201 acquires a MAC address of the CM to which the input packet is transmitted, extracts the acquired MAC address and a data field to a set location from among tipper data fields of the input packet, and composes the search character string.

In operations S505 and S506, the downstream service flow classifier 201 searches for the service flow classification table 405 using the search character string.

In operation S507, when a corresponding data array exists, the downstream service flow classifier 201 extracts service flow-related information from the downstream service flow information table 409 using a retrieved index.

In operation S508, after the downstream service flow classifier 201 composes internal header information based on the service flow information, the downstream service flow classifier 201 adds the internal header to an upper portion of the input packet and generates information of an output packet.

In operation S509, the downstream service flow classifier 201 transmits, to the downstream channel scheduling unit, the downstream packet in which the internal header is added.

In operation S510, when a corresponding service flow cannot be found in operation S506, the downstream service flow classifier 201 classifies the service flow as a basic service flow of the corresponding CM, and repeatedly performs operations from operation S507 using the basic service flow as an index of a predetermined service flow information table of a basic service flow information location.

Since failing in finding information of the CM to which the inputted packet is transmitted in operation S503 denotes a packet transmitted to an unknown address, the service flow is classified as a broadcast service flow based on a transmission rule of IEEE 802.1 in operation S511.

Accordingly, in operation S511, the downstream service flow classifier 201 repeatedly performs operations from operation S507 using the index of the predetermined service flow information table for the broadcast service flow.

In operations S501 through S511, even when a plurality of classifiers exists in the CM, the service flow classification process is similarly performed. The service flow classification process is not performed based on a priority of a classifier until corresponding information is found.

According to an exemplary embodiment of the present invention disposes a classifier having a high priority in an upper location when classification information is inputted in the service flow classification table. Therefore, when at least one corresponding data array is generated, a repeated classification process is enabled not to be performed by outputting the data array located in the upper portion even when the plurality of classifiers exists.

As described above, the downstream service flow classifier 201 according to an exemplary embodiment of the present invention composes service flow classification information including data acquired from the service flow information table, and composes the internal header.

As illustrated in FIG. 6, the packet format including the internal header may be added to the upper portion of the input packet.

Referring to FIG. 6, information included in the internal header may include DOCSIS header type information (Pkt Type) 601, a priority 602 applied to transmission scheduling, a DSID 603, and DC list information 604 to be provided with a downstream transmission service.

The information included in the internal header is used for determining a downstream channel to which a packet is transmitted, composing a complete DOCSIS MAC frame, and transmitting the DOCSIS MAC frame to a CM.

An exemplary embodiment of the present invention provides a method of classifying a CM to which downstream data packets inputted in an IEEE 802.3 MAC/DIX or IEEE 802.1P/Q configuration are transmitted from a network interface, a method of classifying an inputted packet into a specific service flow based on a classification rule classified by a service flow of a corresponding CM, a method of transmitting classified service flow information to a downstream packet scheduling block of a CMTS MAC layer, and a portion with respect to a data structure to embody the methods. A portion with respect to a control function related to generation/deletion of the service flow and a scheme of scheduling to a downstream channel is excluded from a category of the present invention.

The method of classifying the downstream service flows according to the above-described exemplary embodiments may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to the present invention, it is possible to simplify a configuration of a data information table used for packet classification when classifying a packet inputted from a network interface by a service flow to be transmitted, and minimize a packet classification time with respect to inputted packets.

Also, according to the present invention, it is possible to classify a service flow based on a priority using a single search without a repeated classification process even when at least one classifier is set for each CM.

Also, according to the present invention, it is possible to enhance easiness of hardware embodiment, thereby being effectively used for a downstream frame processing system composing a CMTS MAC layer.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A computerized method of classifying downstream service flows in a Cable Modem Termination System (CTMS), the method comprising:
   extracting a destination address of an input packet, which is an Ethernet packet;
   determining by a processor whether an Ethernet Media Access Control (MAC) address of a cable modem (CM) to which the input packet is addressed exists in a MAC address search table, by searching the MAC address search table based on the destination address;
   composing a search character string comprising the Ethernet MAC address of the CM retrieved from the MAC address search table and Quality of Service (QoS) information included in the input packet when the Ethernet MAC address of the CM corresponding to the destination address exists in the MAC address search table;
   searching, with the search character string, for a reference address corresponding to the search character string where the reference address is an index into a service flow information table, and searching for service flow information based on the retrieved reference address when the reference address is retrieved;
   composing an internal header including the retrieved service flow information and adding the internal header to the input packet to form a downstream packet, wherein contents of the input packet are not modified, and wherein the retrieved service flow information includes a priority applied to transmission scheduling of the downstream packet; and
   providing the downstream packet to a downstream channel scheduling unit, wherein when the Ethernet MAC address of the CM to which the input packet is addressed is not found in the MAC address search table, the downstream service flow is classified as a broadcast service flow that is associated with an index into a predetermined service flow information table from which broadcast service flow information is retrieved; and the retrieved broadcast service flow information is included in the internal header, and the internal header is added to the input packet to form the downstream packet.

2. The method of claim 1, wherein, when the reference address corresponding to the search character string is not retrieved, the downstream service flow is classified as a basic service flow information, where the basic service flow is associated with an index into a predetermined service flow information table from which basic service flow information is extracted and the extracted basic service flow information is included in the internal header, and the internal header is added to the input packet to form the downstream packet.

3. The method of claim 1, wherein, when at least two reference addresses corresponding to the search character string are retrieved, the service flow information is retrieved based on the reference address located in a top address.

4. An apparatus for classifying downstream service flows, the apparatus comprising:

a downstream service flow classifier to receive service flow information about an input packet which is an Ethernet packet, and to add an internal header to the input packet to form a downstream packet, wherein contents of the input packet are not modified, and to provide the downstream packet to a downstream channel scheduling unit;

an address table to provide the downstream service flow classifier with an Ethernet MAC address of a cable modem (CM) corresponding to a destination address of the input packet;

a service flow classification table to receive a search character string comprising the Ethernet MAC address of the cable modem (CM) and Quality of Service (QoS) information retrieved from the input packet, from the downstream service flow classifier, where the downstream service flow classifier searches the service flow classification table for a reference address associated with the search character string, where the reference address indexes into an entry of a service flow information table comprising service flow information, and to provide the downstream service flow classifier with the retrieved reference address; and a service flow information table to provide the downstream service flow classifier with the service flow information corresponding to the retrieved reference address, wherein the service flow information includes a priority applied to transmission scheduling of the downstream packet, wherein when the Ethernet MAC address of the CM to which the input packet is addressed is not found in the MAC address search table, the downstream service flow is classified as a broadcast service flow that is associated with an index into a predetermined service flow information table from which broadcast service flow information is retrieved; and the retrieved broadcast service flow information is included in the internal header, and the internal header is added to the input packet to form the downstream packet.

5. The apparatus of claim 4, wherein the search character string consists of the address information of the CM and Quality of Service (QoS) information included in the input packet.

6. The apparatus of claim 4, wherein the service flow information table includes at least one of priority information of a service flow corresponding to the reference address information, a Downstream Service Identification (DSID), and Downstream Channel (DC) list information.

7. The method of claim 1, wherein higher priority classifiers are disposed in an upper location of the service flow classification table.

8. The apparatus of claim 4, wherein higher priority classifiers are disposed in an upper location of the service flow classification table.

9. The apparatus of claim 1, wherein each entry of a service flow classification table has a one to one relationship with each entry of the service flow information table.

10. The method of claim 1, wherein the search character string consists of the Ethernet MAC address of the CM and the QoS information retrieved from the input packet.

11. The method of claim 1, wherein the downstream packet is formed such that the internal header is contiguous with the input packet.

12. The method of claim 1, wherein the downstream packet consists of the internal header and the input packet.

13. The apparatus of claim 4, wherein each entry of the service flow classification table has a one to one relationship with each entry of the service flow information table.

14. The apparatus of claim 4, wherein when the reference address corresponding to the search character string is not found in the MAC address search table, the downstream service flow is classified as a basic service flow information, where the broadcast service flow information is associated with an index into a predetermined service flow information table from which service flow information is extracted; and the extracted basic service flow information is included in the internal header, and the internal header is added to the input packet to form the downstream packet.

15. The apparatus of claim 4, wherein the downstream packet is formed such that the internal header is contiguous with the input packet.

16. The apparatus of claim 4, wherein the downstream packet consists of the input packet and the internal header.

* * * * *